United States Patent [19]
McGinnis

[11] Patent Number: 5,822,471
[45] Date of Patent: Oct. 13, 1998

[54] DIFFERENTIAL OPTICAL MODULATOR

[75] Inventor: Brian P. McGinnis, Newark, Del.

[73] Assignee: Elsicon, Inc., Wilmington, Del.

[21] Appl. No.: 885,294

[22] Filed: Jun. 27, 1997

[51] Int. Cl.$^6$ ...................................................... G02F 1/01
[52] U.S. Cl. .................................. 385/1; 385/16; 385/24; 359/123
[58] Field of Search ................................. 385/1–12, 16, 385/18, 24; 356/345; 359/123

[56] References Cited

U.S. PATENT DOCUMENTS

| | | | |
|---|---|---|---|
| 5,144,375 | 9/1992 | Gabriel et al. | 356/345 |
| 5,438,340 | 8/1995 | Webb et al. | 356/345 |
| 5,493,433 | 2/1996 | Prucnal | 359/123 |

*Primary Examiner*—Phan T. H. Palmer
*Attorney, Agent, or Firm*—Paul J. Shannon, Agent

[57] ABSTRACT

A differential optical modulator for modulating an optical beam with a forward propagating path includes a polarization component to polarize the optical beam and provide redirection of the optical beam dependent on its polarization state, a polarization dependent path component to generate two temporally sheared orthogonal polarization components of the optical beam, a polarization exchange component that mutually exchanges the two orthogonal polarization states, a reflective switch component to modulate the two temporally sheared orthogonal polarization components of the optical beam by an applied control signal and to reflect the modulated optical beam back along the forward propagating path creating a return path, and a control means for providing an applied control signal to the reflective switch component.

10 Claims, 12 Drawing Sheets

DIFFERENTIAL OPTICAL MODULATOR

BACKGROUND OF THE INVENTION

The ability to temporally modulate an optical beam is necessary to communicate time-dependent information by optical means. The primary example of this is the optical fiber communication network that is the basis for modern day telecommunications. Methods for implementing the modulation of an optical beam typically fall within two categories: direct modulation and differential modulation. Direct modulation is performed by directly changing the amplitude and/or phase of the optical beam as induced by an applied control signal. Differential modulation is performed by taking the functional difference between the changes in the amplitude and/or phase of the optical beam at two different times as induced by the applied control signal.

The differences between direct and differential modulation has important consequences in the implementation of real systems. For example, a short temporal gate in the optical beam is the desired functionality of many modulation devices in optical communication systems. For direct modulation, a temporal gate in the applied control signal is required to produce a temporal gate in a continuous wave optical beam. Furthermore, in order to generate fast temporal pulses in the optical beam, the direct modulator requires that the materials and components used to generate the phase and/or amplitude change in the optical beam have a fast switch-on and switch-off. However, for a differential modulator, a fast temporal step-like change in the applied control signal and a fast switch-on are sufficient to generate a fast temporal gate in the continuous wave optical beam. Since it is easier to generate a fast temporal step-like change in an applied control signal and to find slowly recovering materials and components with a fast switch-on, a differential modulator results in fast optical devices and systems which are flexible and easy to implement.

Differential optical modulators can be implemented using interferometric designs which incorporate a direct modulator as one of the components. But in practical implementations, it is important to stabilize the interferometer against undesired drifts in its output state. This can be accomplished via active stabilization, rigid structure, self-referencing designs, or some combination. Self-referencing designs, e.g., a Sagnac interferometer as described in Hecht and Zajac, Optics, Addison-Wesley, 1979, pg. 292, can offer both stable operation and simple implementation and represent an important class for applications. Self-referencing designs use some type of common-path design so that both beams in the interferometer experience the same environmental perturbations. This leads to the very desirable result that the environmental perturbations cancel out.

Efforts to develop differential modulators to be used as optical demultiplexers have recently focused on specific devices incorporating optical fiber and semiconductor optical amplifiers. For examples, see Gabriel, et.al., U.S. Pat. No. 5,144,375, Prucnel et.al., U.S. Pat. No. 5,493,433, Webb, et.al., U.S. Pat. No. 5,483,340, and references therein. These designs are Sagnac interferometers that are based on loops that generate a spatial separation of the beam into two physical beams that are injected into both sides of a transmissive switch component located within the spatial loop.

However, because the optical beams in spatial loops are physically separated and counter-propagating, differential modulators based on reflective switch components that are operated in reflection at near normal incidence have not been realized. If a method was devised where reflective switch components could be used, differential modulators that are simple, compact, and reliable could be implemented. This would result in lower cost differential optical modulators that are easier to manufacture.

A new differential optical modulator design that allows the use of reflective switch components at near normal incidence is disclosed in this invention.

SUMMARY OF THE INVENTION

The invention describes a differential optical modulator for differentially modulating an optical beam by an applied control signal. The invention has these attributes:

a polarization component (PC) to polarize the optical beam and provide redirection of an optical beam dependent on its polarization state;

a polarization dependent path component (PDPC) to generate an optical beam that consists of two temporally-sheared co-propagating orthogonal polarization components;

a polarization exchange component (PEC) that mutually exchanges the two orthogonal polarization states;

a reflective switch component (RSC) to modulate the two temporally sheared orthogonal polarization components of the optical beam by an applied control signal and to reflect the modulated optical beam back along the forward propagating path creating a return path;

control means for providing an applied control signal to the reflective switch component;

input means for applying an input optical beam to the differential optical modulator; and output means for acquiring the output optical beam of the differential optical modulator.

DETAILED DESCRIPTION OF DRAWINGS

DETAILED DESCRIPTION OF THE INVENTION

The term "optical beam", as used herein, refers to at least one cone of light consisting of wavelengths between 0.20 and 10 μm. The angle of the cone may be limited by at least two of the apertures of the components comprising the invention. The optical beam can be continuous, pulsed or a combination of both. The optical beam may contain spatial variations in intensity that remain constant or change with time.

The term "polarization state", as used herein, refers to the electric field vector of an optical beam as is typically used by those skilled in the art.

The term "polarization component", as used herein, refers to at least one component that polarizes the optical beam into a desired polarization state and provides redirection of an optical beam dependent on its polarization state.

The term "polarization beamsplitter", as used herein, refers to a component that provides a redirection of an optical beam dependent upon its polarization state.

The term "polarization dependent path", as used herein, refers to an optical path for two orthogonal polarization states such that there is an optical path difference for the two orthogonal polarization states that introduces a temporal difference between the two polarization states while retaining their angular and spatial relationships. The term "polarization dependent path component", as used herein, refers to at least one component that generates a polarization dependent path.

The term "temporal shear", as used herein, refers to the temporal difference between the two polarization states generated by the polarization dependent path component.

The term "polarization exchange", as used herein, refers to converting one orthogonal polarization state to another orthogonal polarization state and visa versa. For instance, consider two linear orthogonal polarization states defined as horizontal and vertical. Upon completed traversal of a polarization exchange component, the horizontal polarization state becomes a vertical polarization state and the vertical polarization state becomes a horizontal polarization state. The term "polarization exchange component" as used herein, refers to at least one component that generates a polarization exchange.

The term "reflective switch component", as used herein, refers to at least one component that performs the functions of reflecting the optical beam back along the forward propagating path thereby creating a return path and by an applied control signal, provide a temporal change in the amplitude and/or phase of the optical beam that impinges upon it.

The term "applied control signal", as used herein, refers to at least one signal, applied to the reflective switch component, which determines the magnitude of the amplitude and/or phase change induced in the optical beam. The applied control signal can be a time-varying magnetic and/or electric field, a portion of the optical beam and/or a second optical beam. The applied control signal can have spatial variations that can induce spatially dependent changes in reflective switch component which can subsequently induce spatially dependent changes in the optical beam.

The term "electro-optic modulator", as used herein, refers to a device which operates on an optical beam consisting of a material with refractive indices and/or an absorption band that can be modified by an applied voltage at the wavelength (s) of the optical beam.

The term "saturable absorber", as used herein, refers to a device which changes its absorption and/or refractive index at the wavelength(s) of the optical beam when an applied control signal of light is applied and absorbed by the device.

The term "saturable gain device", as used herein, refers to a device which changes its optical amplification and/or refractive index at the wavelength(s) of the optical beam when an applied control signal of light is applied and is either absorbed or amplified by the device.

The term "optical pump", as used herein, refers to an applied control signal of light applied to the reflective switch component to induce changes in the optical beam. The source of the light in the optical pump can be a portion of the optical beam itself and/or a second optical beam.

Figure 1:
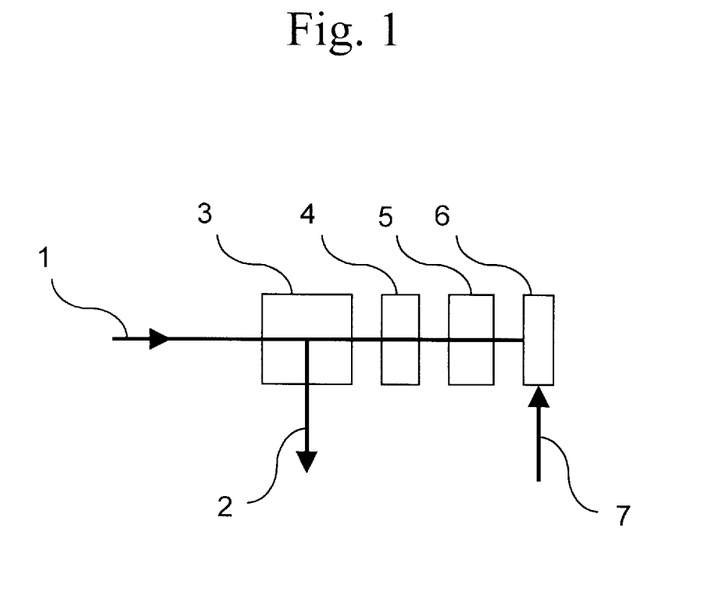
FIG. 1. Illustrates one embodiment of the differential optical modulator of the invention.

FIG. 1 illustrates one general embodiment of a differential optical modulator of this invention. An optical beam is input 1 to the differential optical modulator and the resulting output 2 exits the device as a differential modulation on the input beam. The differential optical modulator comprises a polarization component 3, a polarization dependent path component 4, a polarization exchange component 5, a reflective switch component 6, and a control means 7 that is an applied control signal. The polarization exchange component 5 is located after the polarization dependent path component 4 relative to the input optical beam 1. The polarization exchange component can be incorporated into the reflective switch component and is not limited to the configuration of FIG. 1.

The differential optical modulator of FIG. 1 operates in the following fashion. An optical beam 1 enters the system and forward propagates through a polarization component 3 that defines the input polarization state of an optical beam and redirects the optical beam dependent on its polarization state. The optical beam then propagates through a polarization-dependent path component 4 configured to produce a temporal shear between two emerging orthogonal polarization states. The optical beam then forward propagates through a polarization exchange component 5 which completely exchanges the two orthogonal polarization states after the optical beam passes through on its return path. The optical beam enters the reflective switch component 6 and has its amplitude and/or phase changed as determined by an applied control signal 7 and then reflects back along the forward propagating path creating a return path through the components.

Upon impinging the polarization component 3 on the return path, the temporally modulated portion of the optical beam induced by the applied control signal 7 exits as the output 2 of the polarization component. The polarization component can be designed to provide two useful output optical beams. One output optical beam will be the temporally modulated portion of the optical beam (e.g., an optical pulse) and the other output optical beam can be the inverse response of the first output optical beam (e.g., a pulsed drop in the constant intensity background of the other optical beam).

Sources of the optical beam input into the differential optical modulator of this invention include, but are not limited to, gas lasers, solid-state lasers, doped fiber lasers, semiconductor diode lasers, semiconductor diode laser arrays, lamps, light emitting diodes, light emitting diode arrays and optical systems that emit an optical beam originating from these sources.

The generalized diagram and discussion of the configuration above is not meant to limit the scope of the invention but to illuminate its features. One skilled in the art will recognize that it is possible to vary the system configuration discussed above and still achieve the same results. For example, the elements of the polarization exchange component and the reflective switch component may be combined but still perform the same function combined as the two independent components discussed above.

The examples of the various components for the invention discussed below are provided for the purpose of clarification, and are not to be construed as limiting the scope of the invention.

The polarization component (PC) can be one or more of the following elements: film polarizer and beamsplitter, a thin film cube polarization beamsplitter, a thin film plate polarization beamsplitter, a dielectric plate oriented at Brewster's angle, a Glan-Thompson beamsplitter, a Wollaston beamsplitter, or a Rochon beamsplitter. Preferred is a thin film cube polarization beamsplitter.

A suitable polarization dependent path component (PDPC) is a birefringent medium with at least two axes with different refractive indices. A linear or elliptical polarization whose major axis is oriented at an angle between 0 and 90 degrees with respect to the media axes will decompose into two orthogonal components which acquire an optical path difference of $(n_s-n_f)L$, where $n_s$ and $n_f$ are the refractive indices of the slow axis and fast axis, respectively, and L is the length of the birefringent medium. Examples of birefringent media are a uniaxial crystal, a biaxial crystal, liquid crystals, aligned organic materials, and a birefringent optical fiber.

Figure 2:
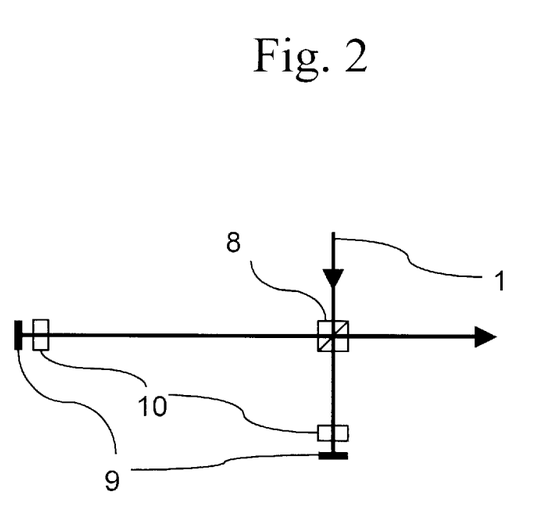
FIG. 2. Unbalanced Michelson interferometer used for polarization dependent path component.

Another PDPC suitable for the invention is an unbalanced Michelson interferometer where an optical beam 1 propagates through a polarization beamsplitter 8, quarter waveplates 10, and mirrors 9, as shown in FIG. 2.

Figure 3:
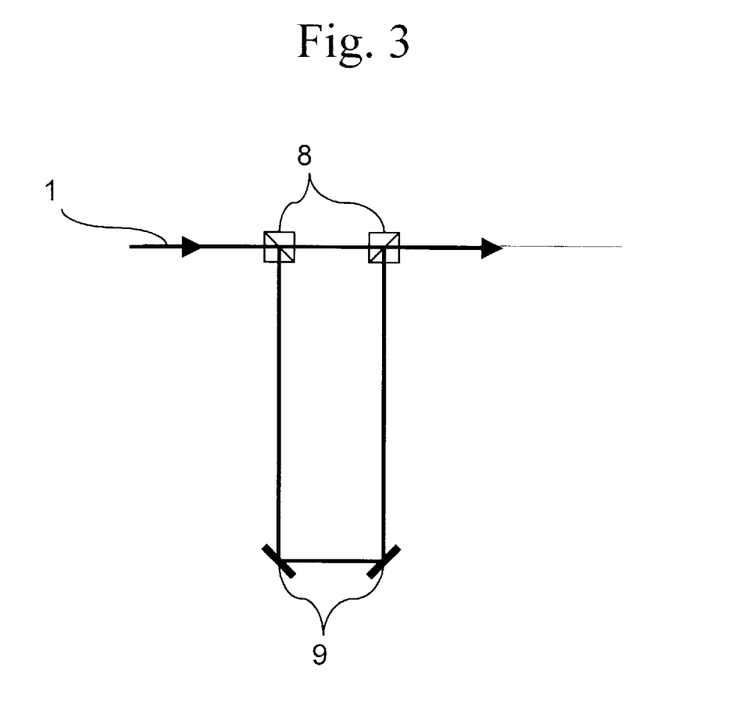
FIG. 3. Unbalanced Mach-Zehnder inteferometer used for polarization dependent path component.

Another PDPC is an unbalanced Mach-Zehnder interferometer where an optical beam 1 propagates through a pair of polarization beamsplitters 8 and a pair of mirrors 9 as shown in FIG. 3.

A preferred polarization dependent path component is the birefringent crystal such as calcite due to its compact size, stability and manufacturability.

A polarization exchange component (PEC) suitable for the invention is a Faraday rotator which after two passes of the optical beam can produce the orthogonal polarization state of said beam. For example, on a single pass, a Faraday rotator can rotate an input polarization by 45° at its output. Reflecting the beam back through the Faraday rotator adds another rotation 45° for a sum total of 90° rotation. This exchanges one orthogonal polarization state into the other.

Another suitable PEC is a quarterwave plate oriented at 45° with respect to the linear input polarization states to produce circular polarization at its output. Reflecting the beam back through the quarterwave plate converts the circular polarization back to linear with a 90° rotation. This exchanges one orthogonal polarization state into the other.

Another suitable PEC is a Fresnel rhomb that performs a similar function as a quarter-wave plate.

The reflective switch component performs two functions. These functions may be accomplished through an integrated structure or through multiple elements which when combined perform similarly to an integrated structure.

One function of the reflective switch component is to reflect the optical beam back along the forward propagating path creating a return path.

The other function of the reflective switch component is to provide a temporal change in the amplitude and/or phase of the optical beam that impinges upon it. This may be accomplished by changes in the absorption and/or refractive index of the reflective switch component.

Figure 4:
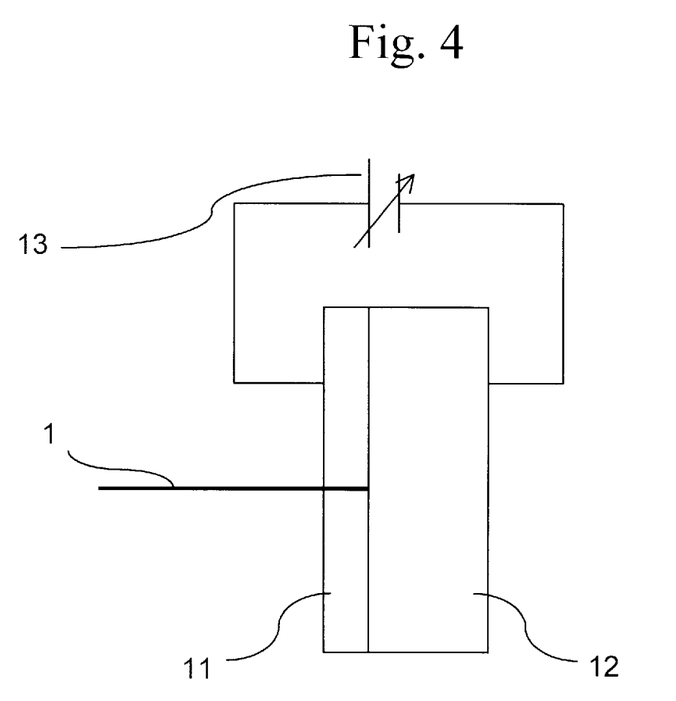
FIG. 4. Electro-optic modulator with an integrated reflector for reflective switch component.

A suitable reflective switch component (RSC) for the invention is an electro-optic modulator 11 and an integrated reflector 12 as shown in FIG. 4. Temporal changes in the voltage 13 applied to the modulator is the applied control signal. These result in temporal changes in the amplitude and/or phase of the optical beam 1. An example of an RSC is an epitaxially-grown semiconductor modulator and high reflecting Bragg mirror stack as described by R. H. Yan, et. al., IEEE J. Quantum Electr. QE-25, 2272 (1989).

Figure 5:
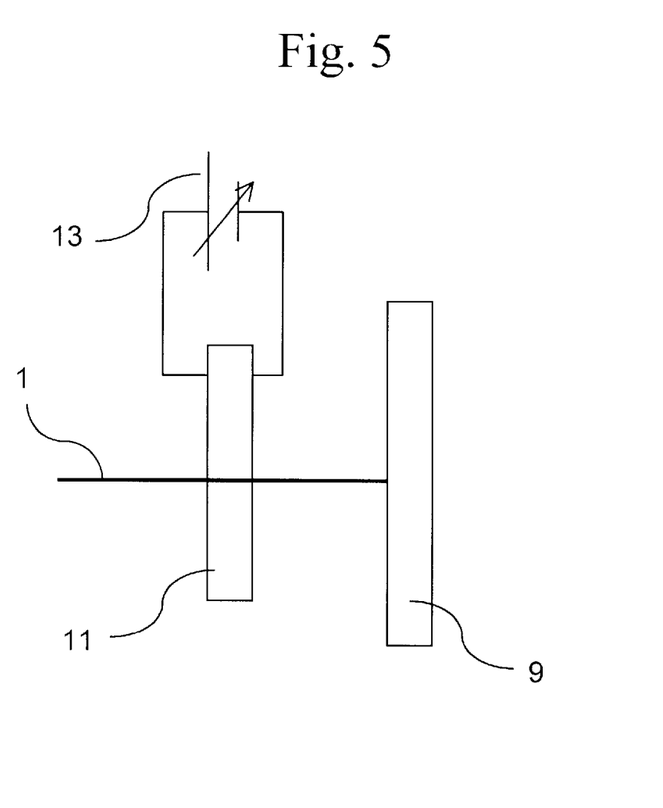
FIG. 5. Electro-optic modulator and separate mirror for reflective switch component.

Another suitable RSC is an electro-optic modulator 11 operated to transmit the optical beam 1 followed by a mirror 9 as shown in FIG. 5. In this configuration, it is possible to insert the polarization exchange component (not shown) between the modulator and the mirror effectively combining the functions of the PEC and RSC. Temporal changes in the voltage 13 applied to the modulator is the applied control signal. These result in temporal changes in the amplitude and/or phase of the optical beam 1. An example is a lithium niobate phase modulator and a mirror.

Figure 6:
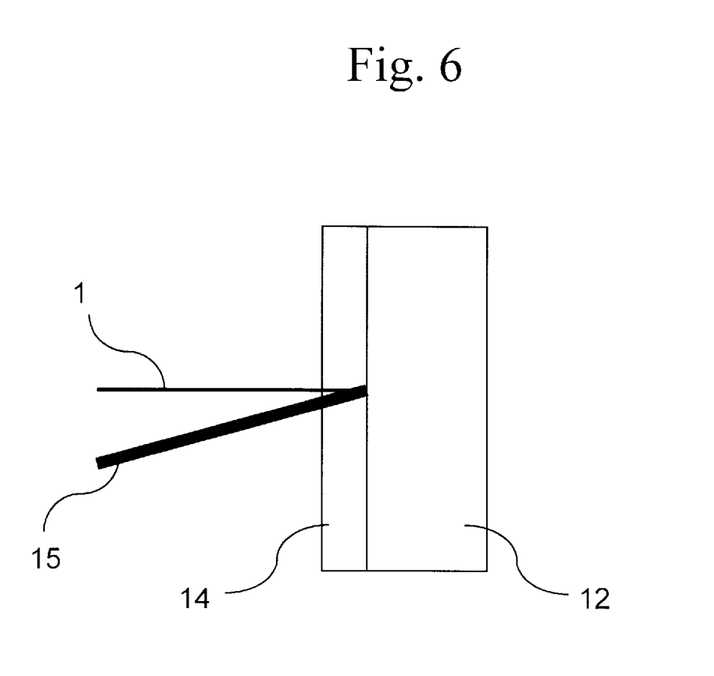
FIG. 6. Saturable absorber with an integrated reflector for reflective switch component.

Another suitable RSC is a saturable absorber 14 and an integrated reflector 12 as shown in FIG. 6. Temporal changes in the optical pump illumination 15 applied to the saturable absorber is the applied control signal. These result in temporal changes in the amplitude and/or phase of the optical beam 1.

Figure 7:
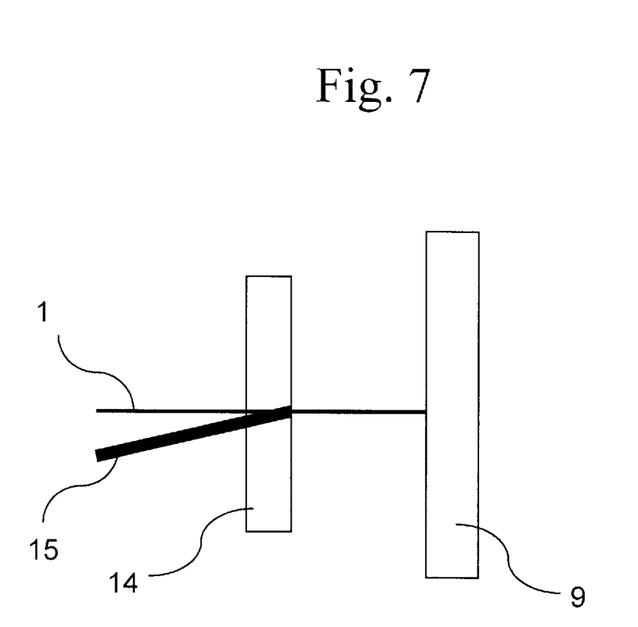
FIG. 7. Saturable absorber and separate mirror for reflective switch component.

Another suitable RSC is a saturable absorber 14 operated to transmit the optical beam 1 followed by a mirror 9 as shown in FIG. 7. In this configuration, it is possible to insert the polarization exchange component (not shown) between the modulator and the mirror effectively combining the functions of the PEC and RSC. Temporal changes in the optical pump illumination 15 applied to the saturable absorber is the applied control signal. These result in temporal changes in the amplitude and/or phase of the optical beam 1.

Examples of saturable absorbers which are combined with an integrated reflector or an external mirror to form the RSC are dyes in solvent carriers, dyes in polymers, semiconductor materials, and semiconductor-doped glasses.

A saturable gain device and an integrated reflector is another suitable RSC and would be similarly configured as the RSC in FIG. 6. Temporal changes in the optical pump illumination applied to the saturable gain device is the applied control signal. These result in temporal changes in the amplitude and/or phase of the optical beam.

Another suitable RSC is a saturable gain device operated to transmit the optical beam followed by a mirror and would be similarly configured as the RSC in FIG. 7. In this configuration, the polarization exchange component (not shown) may be inserted between the modulator and the mirror effectively combining the functions of the PEC and the RSC. Temporal changes in the optical pump illumination applied to the saturable gain device is the applied control signal. These result in temporal changes in the amplitude and/or phase of the optical beam.

Examples of saturable gain devices which are combined with an integrated reflector or an external mirror to form the RSC are a semiconductor optical amplifier and a solid-state laser crystal.

Although each of the examples of the PC, PEC, PDPC, and RSC when combined into a differential optical modulator are sufficient by themselves to illustrate the invention, it may be useful to combine more than one of each example to perform each function of the differential modulator. For example, the PC can be comprised of a Glan-Thompson polarizer and a thin film cube polarizer to improve the degree of polarization of the light, and a PDPC can be comprised of a birefringent crystal and birefringent optical fiber to fine tune the magnitude of the temporal shear.

Many of the optical components used as examples in the PC, PEC, PDPC, and RSC can be acquired from the following vendors Newport Corporation, Irvine, Calif., New Focus, Mountain View, Calif., and CVI Corporation, Albuquerque, N.Mex.

A distinct advantage of the differential optical modulator for the invention is the ability to construct the differential optical modulator out of compact components which can be contacted for easy assembly and rugged stability. As an example, consider a differential optical modulator wherein the polarizing element is a thin film cube polarization beamsplitter, the polarization path dependent component is a birefringent crystal, the polarization exchange element is a quarterwave plate, and the reflective switch component is an electro-optic semiconductor modulator with an integrated reflector. These elements all have parallel planar surfaces which are easily aligned, contacted and cemented. Each component can be manufactured with small sizes (mm dimensions). For example, a differential optical modulator with a possible gating window of approximately 1 psec would consist of a 2 mm beamsplitter cube, a 2 mm calcite crystal cube, a 0.5 mm×2 mm quarterwave plate and a 1 mm×2 mm semiconductor electro-optic modulator with integrated reflector. The basic components would be 5.5 mm long and occupy a volume of only 22 cubic mm. Thus it is possible to manufacture a compact and easily packaged differential optical modulator.

A differential optical modulator of this invention can be used to generate short optical pulses from optical beams originating from continuous wave or long pulse sources. It can be used to gate optical pulses for optical demultiplexing in a multiplexed communication system. It can be used for optical sampling as in an optical sampling oscilliscope. It can be used to acquire time differential signals from electrical circuits using electro-optic sampling heads. The invention is not limited to single-mode optical beams but may be developed for use with arrays of beams, or may be developed for use with optical images.

The examples of the invention discussed below are provided for the purpose of clarification, and are not to be construed as limiting the scope of the invention.

EXAMPLE 1

Figure 8:
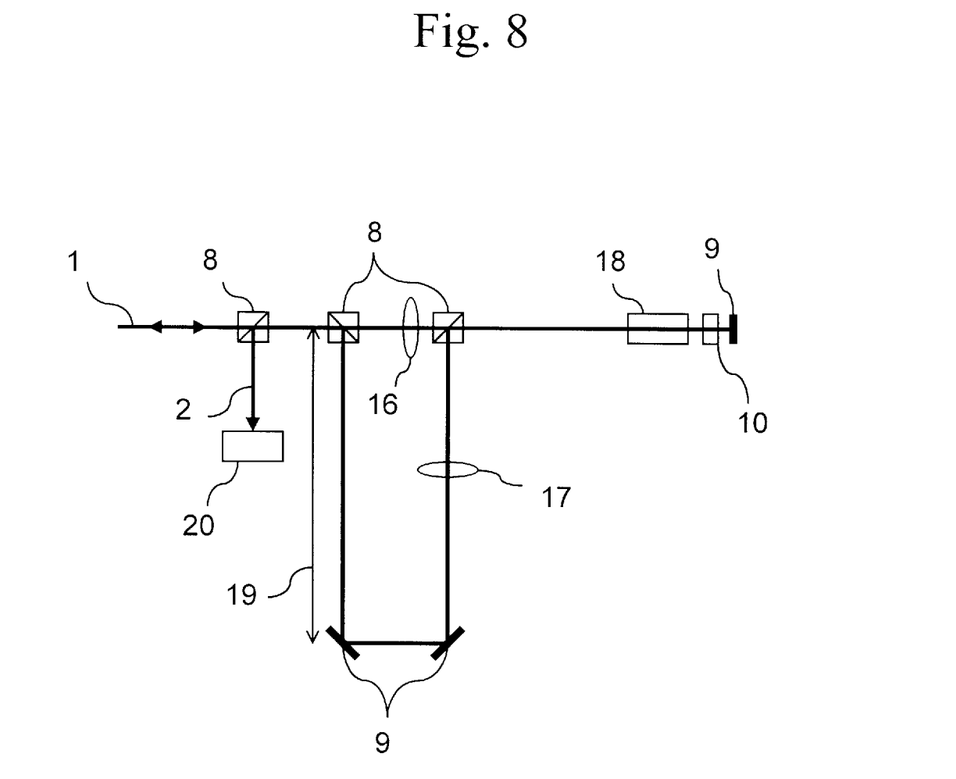
FIG. 8. Illustrates one embodiment of a differential optical modulator.

In this example, the differential optical modulator of this invention is used to generate a nanosecond time scale optical pulse from a continuous wave laser. This example illustrates the temporal differentiation properties of the differential optical modulator of this invention by converting a step-transition applied control signal into an optical pulse at the output. FIG. 8 illustrates the demonstration from a top view as laid out on an optical test bench. The plane of the test bench is in the plane of the figure. The orientation in the plane of the test bench is referred to as horizontal and projection orthogonal to the test bench as vertical. The differential optical modulator of this example comprised a thin film cube polarization beamsplitter 8 for the PC that transmitted a linear polarization state at 45° with respect to horizontal and reflected a linear polarization state in the orthogonal state at an angle of 45° from the horizontal plane; a Mach-Zehnder interferometer for the PDPC comprised of two polarization beamsplitters 8 and two mirrors 9 in the horizontal plane; an electro-optic modulator 18 comprised of a lithium niobate crystal connected electrically in parallel with a resistively isolated DC voltage; a quarter-wave plate 10 with its fast axis oriented at an angle of 45° from the horizontal plane; and a mirror 9 aligned to reflect the optical beam back along the input optical path. The electro-optic modulator 18, the quarter-wave plate 10, and the mirror 9 perform the combined functions PEC and RSC as discussed earlier in the specification. Optical components (mirrors—10D20AL.2, polarization beamsplitters—10FC16PB.5, lenses—KPX112 and KPX118, and waveplate—10RD02-01) were obtained from Newport Corporation, Irvine, Calif.

A continuous wave optical beam 1 from a helium-neon laser (632 nm, Research Electro-Optics, Boulder, Colo.) was incident onto the first polarization beamsplitter 8 which was oriented at 45° with respect to horizontal. The polarization beamsplitters 8 comprising an unbalanced Mach-Zehnder interferometer were oriented at 0° with respect to horizontal. The different paths traveled by the polarization components resulted in a temporal shear between the horizontal and vertical components. The magnitude of this shear, $t_s$ was given by $$t_s = \frac{2 \times s}{c}$$

where s is the length of additional path shown by 19 and c is the speed of light. For this demonstration, s=58 cm which led to a temporal shear $t_s \cong 4$ nanoseconds. The horizontal polarization component was focused by a 30 cm focal length lens 16 onto the mirror 9. The vertical polarization component was focused by a 50 cm focal length lens 17 onto the mirror 9. The lenses were added to compensate for the different beam divergences experienced by the two paths and minimize the beam diameter inside the modulator. They are generally not required to implement the present invention. The temporally-sheared beam passed through an electro-optic modulator 18. The modulator was oriented with its crystal axes aligned along the incident polarization states. Consequently it acted as a pure phase modulator. A quarterwave plate 10 was oriented with its axis at 45° with respect to horizontal. The mirror 9 was aligned to reflect the optical beam back along the forward propagating path creating a return path. The output 2 exits from the polarization beamsplitter 8 where it is detected by a photodetector (Products for Research, Inc., Danvers, Mass.) 20 and displayed on a digital oscilloscope (LeCroy, Spring Valley, N.Y.), not shown.

Figure 9:
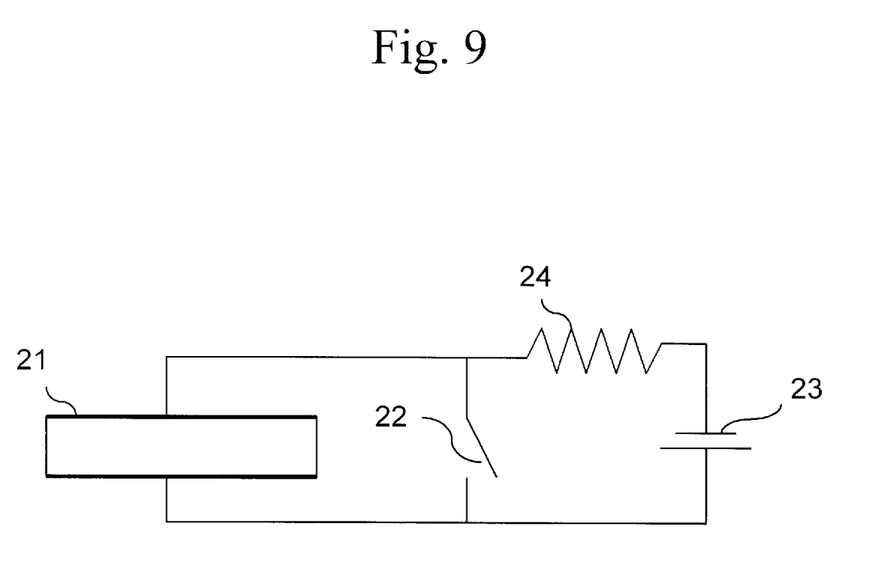
FIG. 9. Illustrates an electrical diagram of modulator configuration.

The electro-optic modulator 18 was electrically connected as shown in FIG. 9. The modulator was a z-cut crystal of lithium niobate 21 (3 mm×4 mm×32 mm, Crystal Technology, Palo Alto, Calif.) coated with gold electrodes on two opposite long surfaces. The electrodes were connected across a high voltage source 23 (400 VDC, Hamamatsu Photonics K.K., Japan) via a 2 MΩ current limiting resistor 24. The voltage across the modulator could be rapidly discharged by closing a mechanical switch 22. When the switch 22 was opened, the modulator would charge through the current limiting resistor 24. The mechanical switch 22, the high voltage source 23, and the current limiting resistor 24, act as the control means for providing the applied control signal to the modulator. The voltage across the modulator consequently was a step-like change upon closing the switch. The phase of the optical beam also experienced a step-like change since the optical index of refraction was a function of the applied voltage.

Figure 10:
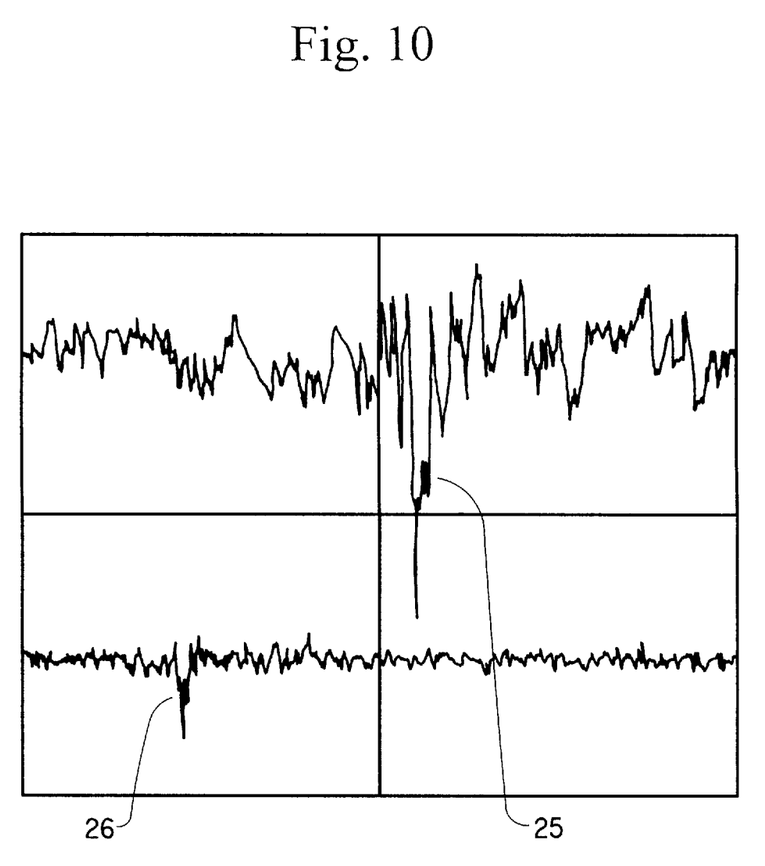
FIG. 10. Example of output from demonstration.

The response of the differential optical modulator to the step-like phase change was expected to be a short optical pulse. The duration of the pulse should be approximately equal to the duration of the rapid falling edge of the step phase change. A representation of the differential optical modulator output as seen on the oscilloscope is shown in FIG. 10. The vertical scale for both traces are arbitrary units representing the signal from the photodetector. The photodetector provided a negative signal for increasing optical power. The response of the differential optical modulator was as expected with a short optical pulse seen by the photodetector. The upper trace 25 in FIG. 10 is an expanded view of the lower trace 26. The time scale for the upper trace 25 is 500 nanoseconds and the optical pulse was less than 20 nanoseconds in duration. The time scale for the lower trace 26 is 2 microseconds.

EXAMPLE 2

Figure 11:
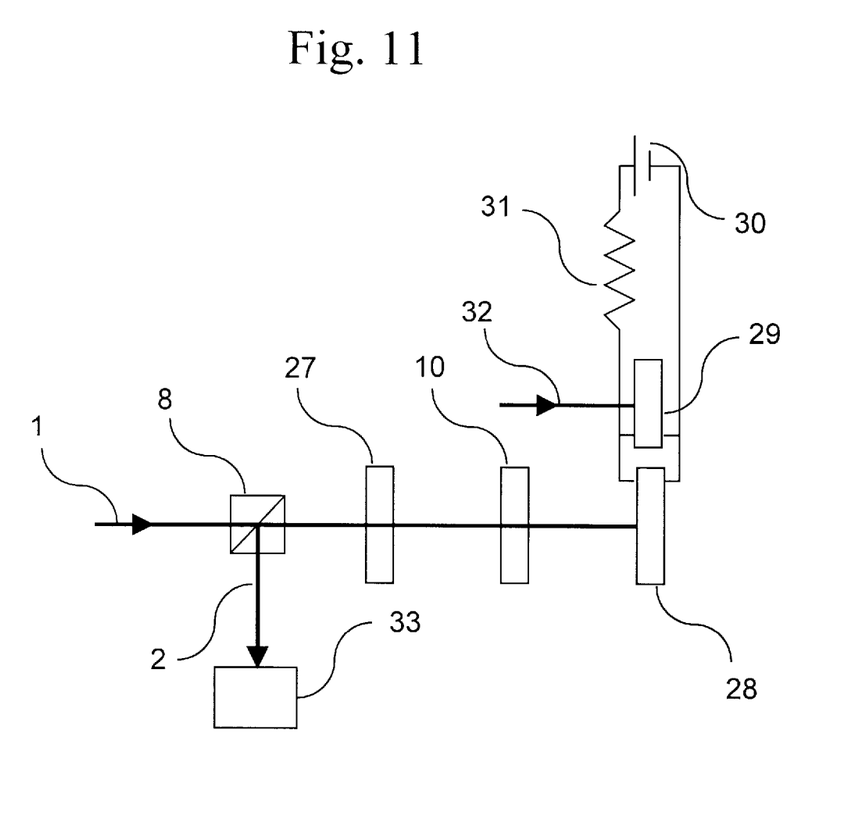
FIG. 11. Example layout of invention for high speed demultiplexer for optical communications.

An example applying the concepts of the invention for demultiplexing a high bit rate digital optical stream in an optical communication system is illustrated in FIG. 11. The differential optical modulator comprises:

a thin film cube polarization beamsplitter 8 for the PC that transmits a linear polarization state in the horizontal dimension and reflects a linear polarization state in the vertical dimension at an angle of 90° to the horizontal plane;

a plate of calcite 27 for the PDPC of thickness L with refractive indices, $n_s$ and $n_f$ for the axes normal to the propagation axis and with said axes rotated at 45° with respect to horizontal;

a quarterwave plate 10 for the PEC with its axes oriented orthonormal to the horizontal plane;

and an electro-optic modulator comprised of a semiconductor multiple quantum well with an integrated reflector 28 (e.g., as described by Weisburg, et.al., Quantum Semiconductor Structures, Academic Press, 1991 and references therein) for the RSC. As a control means for providing an applied control signal to the RSC, an optical clock pulse 32 is incident onto a high speed photodiode 29 which induces a voltage change across the RSC. The source of the voltage is provided by a DC voltage supply 30, nominally 5 volts, through a current limiting resistor 31. With a capacitance of 12 femtofarads for the electro-optic modulator and an impedence of 10 ohms between the photodiode and electro-optic modulator, the discharge rate is 0.12 picoseconds. Consequently the duration of the discharge is limited by the speed of the photodiode. A commercial photodiode available from New Focus, Mountain View, Calif. shows an intrinsic speed of 5 picoseconds. When implemented in this example, the limit of the gating time is less than 10 picoseconds and is compatible with a 100 GHz multiplexed data rate. A fully integrated version should operate at even faster rates.

The optical beam 1 contains pulses of light with the high or low energy of a pulse representing a binary value. The aggregate bit rate of the digital signal contained in the optical beam can be very high, much faster than the ability to transport or process it electronically. An optical clock pulse 32 synchronized to the data channel of interest incident upon the high speed photodiode generates a rapid discharge of the voltage across the modulator with a slow recovery limited by the isolated voltage supply. The discharge rate of the modulator can be very fast since it can be manufactured with extremely low capacitance and the discharge path can be very short. Considering the electrical response of the system as a whole, the applied voltage across the modulator then is a sawtooth-like waveform with a rapid edge synchronous with the data channel of interest.

The differential optical modulator produces a short optical gate synchronized with the applied control signal of duration $(n_s-n_f)L/c$ where c is the speed of light in vacuum. The output 2 of the invention transmits only the data channel of interest and the optical beam is detected with a slower photodetector 33 and processed electronically at the slower baseband rate determined by the clock rather than the high aggregate signal rate of the input optical beam.

Figure 12:
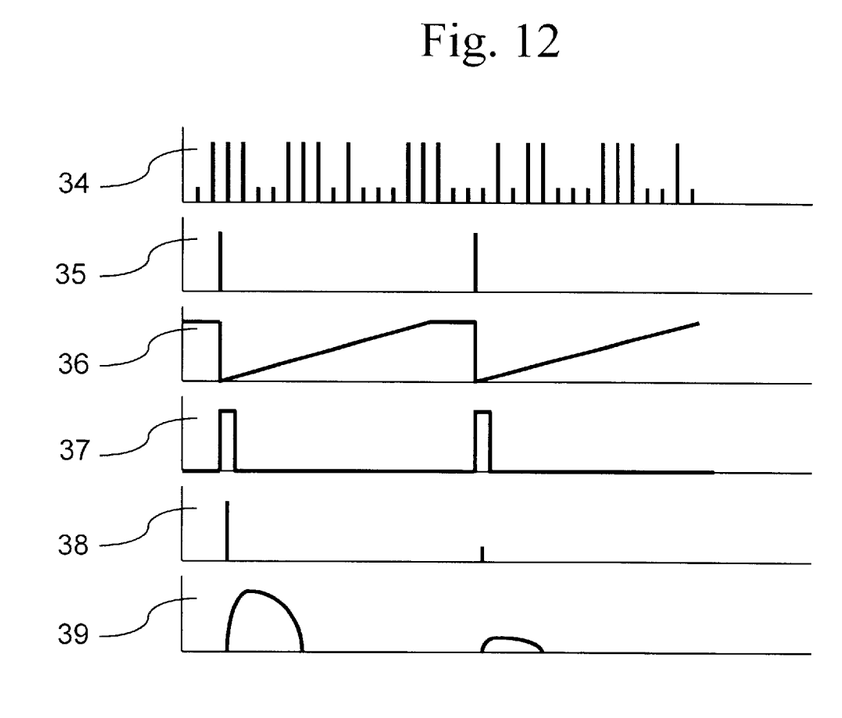
FIG. 12. Timing diagram of invention for high speed demultiplexer for optical communications.

A timing diagram of the operation of this example in the capacity of a demultiplexer unit in a digital optical communication system is shown in FIG. 12. The aggregate data stream, depicted as 34, enters the invention as the optical beam. A synchronous optical clock pulse, depicted as 35, arrives at the baseband rate and timed to select a data channel of interest. The voltage, depicted as 36, applied to the modulator decays rapidly with the arrival of the clock pulse and recovers slowly generating a sawtooth-like response. The invention generates a short optical gate, depicted as 37, synchronous with the clock pulse and the selected data channel appears at the output, depicted as 38. A slower detector integrates and amplifies the output signal, depicted as 39, for further electronic processing.

These examples and the foregoing description are only illustrative of this invention. It is understood that those skilled in the art may devise alternatives to those discussed. The present invention is intended to embrace all such alternatives that fall within the scope of the claims.

What is claimed is:

1. A differential optical modulator for modulating an optical beam with a forward propagating path consisting essentially of:

a polarization component to polarize the optical beam and provide redirection of the optical beam dependent on its polarization state;

a polarization dependent path component to generate two temporally sheared orthogonal polarization components of the optical beam;

a polarization exchange component that mutually exchanges the two orthogonal polarization states;

a reflective switch component to modulate the two temporally sheared orthogonal polarization components of the optical beam by an applied control signal and to reflect the modulated optical beam back along the forward propagating path creating a return path; and a control means for providing an applied control signal to the reflective switch component.

2. A differential optical modulator for modulating an optical beam with a forward propagating path comprising:

a polarization component to polarize the optical beam and provide redirection of the optical beam dependent on its polarization state;

a polarization dependent path component to generate two temporally sheared orthogonal polarization components of the optical beam;

a polarization exchange component that mutually exchanges the two orthogonal polarization states;

a reflective switch component to modulate the two temporally sheared orthogonal polarization components of the optical beam by an applied control signal and to reflect the modulated optical beam back along the forward propagating path creating a return path; and a control means for providing an applied control signal to the reflective switch component.

3. A differential optical modulator according to claim 2 wherein the polarization component is comprised of at least one of the group consisting of: a thin film cube polarization beamsplitter, a thin film plate polarization beamsplitter, a dielectric plate oriented at Brewster's angle, a Glan-Thompson beamsplitter, a Wollaston beamsplitter, and a Rochon beamsplitter.

4. A differential optical modulator according to claim 2 wherein the polarization dependent path component is comprised of at least one of the group consisting of: a birefringent crystal, a medium of liquid crystals, a birefringent optical fiber, a Michelson interferometer, and a Mach-Zehnder interferometer.

5. A differential optical modulator according to claim 2 wherein the polarization exchange component is comprised of at least one of the group consisting of: a Faraday rotator, a waveplate, and a Fresnel rhomb.

6. A differential optical modulator according to claim 2 wherein the reflective switch component is comprised of at least one of the group consisting of: an electro-optic crystal modulator and mirror, an electro-optic semiconductor modulator and mirror, a saturable absorbing semiconductor and mirror, a saturable absorbing dye and mirror, a semiconductor optical amplifier and mirror, an electro-optic crystal modulator and integrated mirror, an electro-optic semiconductor modulator and integrated mirror, a saturable absorbing semiconductor and integrated mirror, a saturable absorbing dye and integrated mirror, and a semiconductor optical amplifier and integrated mirror.

7. A differential optical modulator of claim 2 wherein the polarization component is a thin film polarization beamsplitter, the polarization path dependent component is a birefringent crystal, the polarization exchange element is a quarterwave plate, and the reflective switch component is an electro-optic modulator with an integrated mirror.

8. A differential optical modulator of claim 2 wherein the polarization component of a thin film polarization beamsplitter, the polarization path dependent component is a birefringent crystal, the polarization exchange element is a Faraday rotator, and the reflective switch component is a semiconductor optical amplifier with an integrated mirror.

9. A differential optical modulator of claim 2 wherein all components are assembled in contact.

10. A differential optical modulator of claim 2 that is an optical demultiplexer.

* * * * *